United States Patent
Lin et al.

(10) Patent No.: US 11,863,498 B2
(45) Date of Patent: Jan. 2, 2024

(54) USER EQUIPMENT AND METHOD FOR HANDLING SWITCHING TIME PERIOD OF DOWNLINK-UPLINK SWITCHING FOR HALF DUPLEX-FREQUENCY DIVISION DUPLEX OPERATION

(71) Applicant: FG Innovation Company Limited, Tuen Mun (HK)

(72) Inventors: Wan-Chen Lin, Taipei (TW); Hai-Han Wang, Taipei (TW); Chia-Hao Yu, Taipei (TW)

(73) Assignee: FG Innovation Company Limited, Tuen Mun (HK)

( * ) Notice: Subject to any disclaimer, the term of this patent is extended or adjusted under 35 U.S.C. 154(b) by 193 days.

(21) Appl. No.: 17/397,112

(22) Filed: Aug. 9, 2021

(65) Prior Publication Data

US 2022/0045831 A1    Feb. 10, 2022

Related U.S. Application Data

(60) Provisional application No. 63/062,747, filed on Aug. 7, 2020.

(51) Int. Cl.
| | |
|---|---|
| *H04L 5/00* | (2006.01) |
| *H04L 5/16* | (2006.01) |
| *H04W 72/04* | (2023.01) |
| *H04W 72/044* | (2023.01) |
| *H04W 72/0453* | (2023.01) |
| *H04L 5/14* | (2006.01) |

(52) U.S. Cl.
CPC ............ *H04L 5/0092* (2013.01); *H04L 5/001* (2013.01); *H04L 5/16* (2013.01); *H04W 72/044* (2013.01); *H04L 5/0048* (2013.01); *H04L 5/14* (2013.01); *H04W 72/0453* (2013.01)

(58) Field of Classification Search
CPC ......... H04L 5/0092; H04L 5/16; H04L 5/001; H04L 5/14; H04L 5/0048; H04W 72/044; H04W 72/0453
See application file for complete search history.

(56) References Cited

U.S. PATENT DOCUMENTS

| | | | |
|---|---|---|---|
| 2016/0028533 A1* | 1/2016 | Kazmi | H04W 56/0045 370/296 |
| 2020/0100275 A1* | 3/2020 | Tang | H04W 72/1268 |
| 2021/0337539 A1* | 10/2021 | Lei | H04L 5/16 |

* cited by examiner

*Primary Examiner* — Maharishi V Khirodhar
*Assistant Examiner* — Kenneth P Hunt
(74) *Attorney, Agent, or Firm* — ScienBiziP, P.C.

(57) ABSTRACT

A user equipment and a method for handling a switching time period of downlink (DL)-uplink (UL) switching for half duplex-frequency division duplex operation are provided. The method includes: receiving a first configuration for a first active bandwidth part (BWP) with a first subcarrier spacing (SCS), the first active BWP being one of an active UL BWP and an active DL BWP; receiving a second configuration for configuring a second active BWP with a second SCS, the second active BWP being another one of the active UL BWP and the active DL BWP; receiving a third configuration for the switching time period, the switching time period having a unit of symbol; performing communication with a Base Station (BS) on the first active BWP with the first SCS; and performing, after the switching time period, communication with the BS on the second active BWP with the second SCS.

8 Claims, 14 Drawing Sheets dd # USER EQUIPMENT AND METHOD FOR HANDLING SWITCHING TIME PERIOD OF DOWNLINK-UPLINK SWITCHING FOR HALF DUPLEX-FREQUENCY DIVISION DUPLEX OPERATION

CROSS-REFERENCE TO RELATED APPLICATION(S)

The present disclosure claims the benefit of and priority of provisional U.S. Patent Application Ser. No. 63/062,747, filed on Aug. 7, 2020, entitled "METHOD AND APPARATUS TO HANDLE UL-DL SWITCHING TIME FOR HALF DUPLEX OPERATION FOR NR" ("the '747 provisional"). The disclosure of the '747 provisional is hereby incorporated fully by reference into the present disclosure for all purposes.

FIELD

The present disclosure is related to wireless communication, and more particularly, to a user equipment and a method for handling a switching time period of downlink (DL)-uplink (UL) switching for half duplex-frequency division duplex (HD-FDD) operation in the next generation wireless communication networks.

BACKGROUND

Various efforts have been made to improve different aspects of wireless communication for cellular wireless communication systems, such as fifth-generation (5G) New Radio (NR), by improving data rate, latency, reliability, and mobility. The 5G NR system is designed to provide flexibility and configurability to optimize the network services and types, accommodating various use cases such as enhanced Mobile Broadband (eMBB), massive Machine-Type Communication (mMTC), and Ultra-Reliable and Low-Latency Communication (URLLC).

One important objective of NR is to enable connected industrial devices. NR connectivity aims to provide the service that can improve flexibility, enhance productivity and efficiency, and reduce maintenance cost. One of usage scenarios that have been identified for NR is using low-end services with the requirement of small device form factors with a battery life of several years, including industrial wireless sensors, video surveillance, and wearables. The requirements for supporting this kind of service include reducing device complexity and ensuring lower latency and higher reliability than eMBB service type. To reduce user equipment (UE) complexity, reduced number of receive (RX)/transmit (TX) antennas of UE, UE bandwidth reduction, lower UE power class, half duplex-frequency division duplex (HD-FDD), and relaxed UE processing time or capability can be considered. In terms of HD-FDD, a device is expected to perform a downlink (DL) reception in slots where it does not perform an uplink (UL) transmission. In HD-FDD Type A, there are two separate local oscillators for DL and UL carrier frequency generation, so switching between DL reception and UL transmission is fast. In HD-FDD Type B, a single local oscillator for DL and UL carrier frequency generation is introduced for low-cost devices. Thus, a guard period (or a switching time period) should be inserted at every DL/UL switching point. However, as the demand for radio access continues to increase, there exists a need for further improvements in the art.

SUMMARY

The present disclosure is related to a user equipment and a method for handling a switching time period of downlink (DL)-uplink (UL) switching for half duplex-frequency division duplex (HD-FDD) operation in the next generation wireless communication networks.

In a first aspect of the present disclosure, a method performed by a user equipment (UE) for handling a switching time period of DL-UL switching for HD-FDD operation is provided. The method includes: receiving a first configuration for a first active bandwidth part (BWP) with a first sub-carrier spacing (SCS), the first active BWP being one of an active UL BWP and an active DL BWP; receiving a second configuration for a second active BWP with a second SCS, the second active BWP being another one of the active UL BWP and the active DL BWP; receiving a third configuration for the switching time period, the switching time period having a unit of symbol; performing communication with a Base Station (BS) on the first active BWP with the first SCS; and performing, after the switching time period, communication with the BS on the second active BWP with the second SCS.

In an implementation of the first aspect of the present disclosure, the first SCS is larger than the second SCS, the communication on the first active BWP ends at an ending symbol, the switching time period begins at a starting symbol, and the starting symbol is determined based on the ending symbol.

In an implementation of the first aspect of the present disclosure, the first SCS is larger than the second SCS, the communication on the second active BWP begins at a first starting symbol, the switching time period begins at a second starting symbol, and the second starting symbol is determined based on the first starting symbol.

In an implementation of the first aspect of the present disclosure, the communication on the second active BWP begins at a first starting symbol, the switching time period begins at a second starting symbol, and the second starting symbol is determined based on the first starting symbol.

In an implementation of the first aspect of the present disclosure, the first active BWP is the active DL BWP, the second active BWP is the active UL BWP, and the switching time period includes a timing advance (TA) time period.

In an implementation of the first aspect of the present disclosure, a length of the switching time period is determined based on the second SCS.

In a second aspect of the present disclosure, a UE for handling a switching time period of DL-UL switching for HD-FDD operation is provided. The UE includes one or more non-transitory computer-readable media having computer-executable instructions embodied thereon; and at least one processor coupled to the one or more non-transitory computer-readable media. The at least one processor is configured to execute the computer-executable instructions to: receive a first configuration for a first active BWP with a first SCS, the first active BWP being one of an active UL BWP and an active DL BWP; receive a second configuration for a second active BWP with a second SCS, the second active BWP being another one of the active UL BWP and the active DL BWP; receive a third configuration for the switching time period, the switching time period having a unit of symbol; perform communication with a Base Station (BS) on the first active BWP with the first SCS; and perform, after the switching time period, communication with the BS on the second active BWP with the second SCS.

BRIEF DESCRIPTION OF THE DRAWINGS

Aspects of the disclosure are best understood from the following detailed disclosure when read with the accompanying drawings. Various features are not drawn to scale. Dimensions of various features may be arbitrarily increased or reduced for clarity of discussion.

DESCRIPTION

Figure 1:
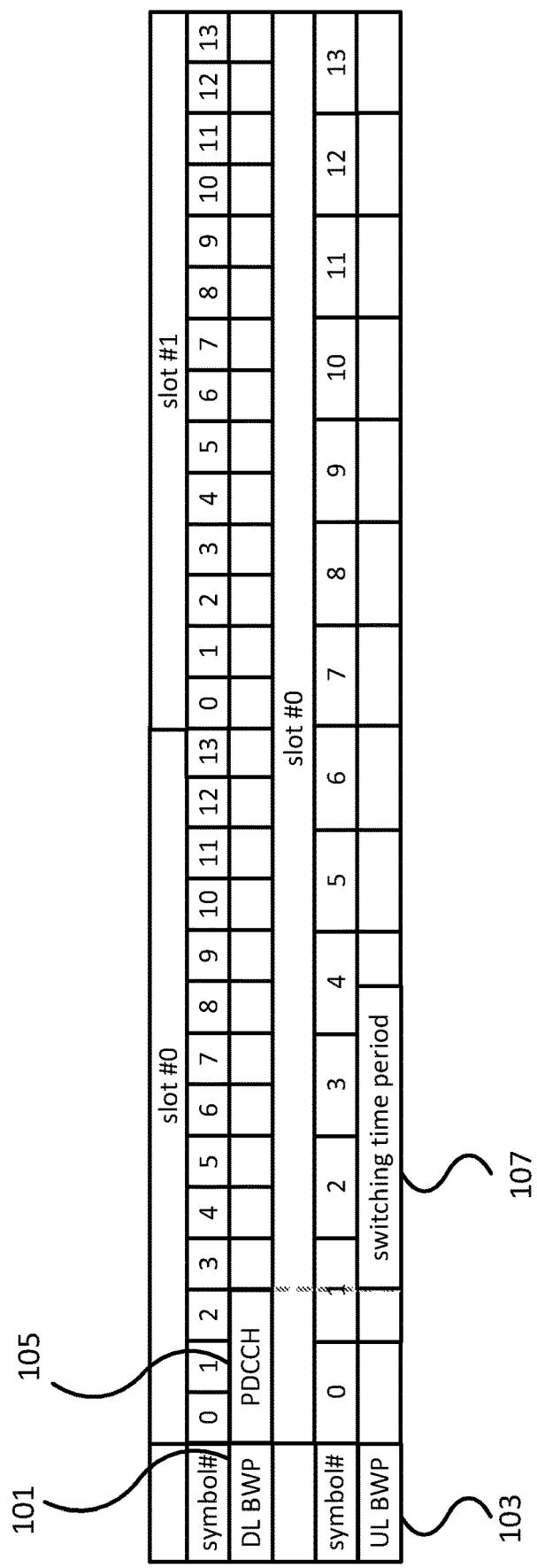
FIG. 1 is a schematic diagram illustrating that the starting symbol of a switching time period does not align with a symbol boundary in an active uplink (UL) bandwidth part (BWP) according to an example implementation of the present disclosure.

The following contains specific information related to implementations of the present disclosure. The drawings and their accompanying detailed disclosure are merely directed to implementations. However, the present disclosure is not limited to these implementations. Other variations and implementations of the present disclosure will be obvious to those skilled in the art. Unless noted otherwise, like or corresponding elements among the drawings may be indicated by like or corresponding reference numerals. Moreover, the drawings and illustrations in the present disclosure are generally not to scale and are not intended to correspond to actual relative dimensions.

For the purpose of consistency and ease of understanding, like features may be identified (although, in some examples, not illustrated) by the same numerals in the drawings. However, the features in different implementations may be different in other respects and shall not be narrowly confined to what is illustrated in the drawings.

The phrases "in one implementation," or "in some implementations," may each refer to one or more of the same or different implementations. The term "coupled" is defined as connected whether directly or indirectly via intervening components and is not necessarily limited to physical connections. The term "comprising" means "including, but not necessarily limited to" and specifically indicates open-ended inclusion or membership in the so-disclosed combination, group, series or equivalent. The expression "at least one of A, B and C" or "at least one of the following: A, B and C" means "only A, or only B, or only C, or any combination of A, B and C."

For the purposes of explanation and non-limitation, specific details such as functional entities, techniques, protocols, and standards are set forth for providing an understanding of the disclosed technology. In other examples, detailed disclosure of well-known methods, technologies, systems, and architectures are omitted so as not to obscure the present disclosure with unnecessary details.

Persons skilled in the art will immediately recognize that any network function(s) or algorithm(s) disclosed may be implemented by hardware, software or a combination of software and hardware. Disclosed functions may correspond to modules which may be software, hardware, firmware, or any combination thereof. A software implementation may include computer executable instructions stored on a computer readable medium such as memory or other type of storage devices. One or more microprocessors or general-purpose computers with communication processing capability may be programmed with corresponding executable instructions and perform the disclosed network function(s) or algorithm(s). The microprocessors or general-purpose computers may include Applications Specific Integrated Circuitry (ASIC), programmable logic arrays, and/or using one or more Digital Signal Processor (DSPs). Although some of the disclosed implementations are oriented to software installed and executing on computer hardware, alternative implementations implemented as firmware or as hardware or as a combination of hardware and software are well within the scope of the present disclosure.

The computer readable medium includes but is not limited to Random Access Memory (RAM), Read Only Memory (ROM), Erasable Programmable Read-Only Memory (EPROM), Electrically Erasable Programmable Read-Only Memory (EEPROM), flash memory, Compact Disc Read-Only Memory (CD-ROM), magnetic cassettes, magnetic tape, magnetic disk storage, or any other equivalent medium capable of storing computer-readable instructions.

A radio communication network architecture such as a Long-Term Evolution (LTE) system, an LTE-Advanced (LTE-A) system, an LTE-Advanced Pro system, or a 5G NR Radio Access Network (RAN) typically includes at least one base station (BS), at least one UE, and one or more optional network elements that provide connection within a network. The UE communicates with the network such as a Core Network (CN), an Evolved Packet Core (EPC) network, an Evolved Universal Terrestrial RAN (E-UTRAN), a 5G Core (5GC), or an internet via a RAN established by one or more B Ss.

A UE may include but is not limited to a mobile station, a mobile terminal or device, or a user communication radio terminal. The UE may be a portable radio equipment that includes but is not limited to a mobile phone, a tablet, a wearable device, a sensor, a vehicle, or a Personal Digital Assistant (PDA) with wireless communication capability. The UE is configured to receive and transmit signals over an air interface to one or more cells in a RAN.

A BS may be configured to provide communication services according to at least a Radio Access Technology (RAT) such as Worldwide Interoperability for Microwave Access (WiMAX), Global System for Mobile communications (GSM) that is often referred to as 2G, GSM Enhanced Data rates for GSM Evolution (EDGE) RAN (GERAN), General Packet Radio Service (GPRS), Universal Mobile Telecommunication System (UMTS) that is often referred to as 3G based on basic wideband-code division multiple access (W-CDMA), high-speed packet access (HSPA), LTE, LTE-A, evolved LTE (eLTE) that is LTE connected to 5GC, NR (often referred to as 5G), and/or LTE-A Pro. However, the scope of the present disclosure is not limited to these protocols.

The BS may include but is not limited to a node B (NB) in the UMTS, an evolved node B (eNB) in LTE or LTE-A, a radio network controller (RNC) in UMTS, a BS controller (BSC) in the GSM/GERAN, an ng-eNB in an Evolved Universal Terrestrial Radio Access (E-UTRA) BS in connection with 5GC, a next generation Node B (gNB) in the 5G-RAN, or any other apparatus capable of controlling radio communication and managing radio resources within a cell. The BS may serve one or more UEs via a radio interface.

The BS is operable to provide radio coverage to a specific geographical area using a plurality of cells forming the RAN. The BS supports the operations of the cells. Each cell is operable to provide services to at least one UE within its radio coverage. Each cell (often referred to as a serving cell) may provide services to serve one or more UEs within its radio coverage such that each cell schedules the DL and optionally UL resources to at least one UE within its radio coverage for DL and optionally UL packet transmissions. The BS can communicate with one or more UEs in the radio communication system via the plurality of cells.

A cell may allocate sidelink (SL) resources for supporting Proximity Service (ProSe) or Vehicle to Everything (V2X) service. Each cell may have overlapped coverage areas with other cells. In Multi-RAT Dual Connectivity (MR-DC) cases, the primary cell of a Master Cell Group (MCG) or a Secondary Cell Group (SCG) may be called a Special Cell (SpCell). A Primary Cell (PCell) may refer to the SpCell of an MCG. A Primary SCG Cell (PSCell) may refer to the SpCell of an SCG. MCG may refer to a group of serving cells associated with the Master Node (MN), comprising of the SpCell and optionally one or more Secondary Cells (SCells). An SCG may refer to a group of serving cells associated with the Secondary Node (SN), comprising of the SpCell and optionally one or more SCells.

As discussed above, the frame structure for NR supports flexible configurations for accommodating various next generation (e.g., 5G) communication requirements such as Enhanced Mobile Broadband (eMBB), Massive Machine Type Communication (mMTC), and Ultra-Reliable and Low-Latency Communication (URLLC), while fulfilling high reliability, high data rate and low latency requirements. The Orthogonal Frequency-Division Multiplexing (OFDM) technology in the 3rd Generation Partnership Project (3GPP) may serve as a baseline for an NR waveform. The scalable OFDM numerology such as adaptive sub-carrier spacing, channel bandwidth, and Cyclic Prefix (CP) may also be used. Additionally, two coding schemes are considered for NR, specifically Low-Density Parity-Check (LDPC) code and Polar Code. The coding scheme adaption may be configured based on channel conditions and/or service applications.

Moreover, it is also considered that in a transmission time interval TX of a single NR frame, downlink (DL) transmission data, a guard period, and uplink (UL) transmission data should at least be included, where the respective portions of the DL transmission data, the guard period, and the UL transmission data should also be configurable, for example, based on the network dynamics of NR. In addition, sidelink resources may also be provided in an NR frame to support ProSe services, (E-UTRA/NR) sidelink services, or (E-UTRA/NR) V2X services.

In addition, the terms "system" and "network" herein may be used interchangeably. The term "and/or" herein is only an association relationship for describing associated objects, and represents that these relationships may exist. For example, A and/or B may indicate that: A exists alone, A and B exist at the same time, or B exists alone. In addition, the character "/" herein generally represents that the former and latter associated objects are in an "or" relationship.

Examples of some selected terms are provided as follows.

Half duplex-frequency division duplex (HD-FDD): It is a duplex scheme whereby communication is possible in two directions, but communication is not possible in both directions at a time.

Bandwidth part (BWP) is a new feature introduced in NR to enable more flexibility in the way resources are assigned in a given carrier, and each BWP may be applied with a different sub-carrier spacing (SCS). Thus, there is a need to clarify the behavior when a BWP for an UL transmission and a BWP for a DL reception are applied with a different SCS for HD-FDD operation.

Since the BWP for the DL reception and the BWP for the UL transmission may be applied with different sub-carrier spacing configurations, the starting point of a switching time period and the duration of the switching time period may become unclear.

In the present disclosure, an original BWP maybe an active BWP where an UL transmission or a DL reception is configured/scheduled before the switching time period, and a target BWP may be an active BWP where an UL transmission or a DL reception is scheduled/configured after the switching time period.

FIG. 1 is a schematic diagram illustrating that the starting symbol of a switching time period does not align with a symbol boundary in an active UL BWP according to an example implementation of the present disclosure. As illustrated in FIG. 1, if a UE is provided with the active DL BWP 101 with the SCS configuration $\mu_{UL}$ and the active UL BWP 103 with the SCS configuration $\mu_{UL}$, and the SCS configuration $\mu_{UL}$ is larger than the SCS configuration $\mu_{UL}$, the end of a DL reception (e.g., physical downlink control channel (PDCCH) reception 105) in the active DL BWP 101 may not align with a symbol boundary in the active UL BWP 103. In this circumstance, the starting symbol of a switching time period 107 may not align with a symbol boundary in the active UL BWP 103.

Figure 2:
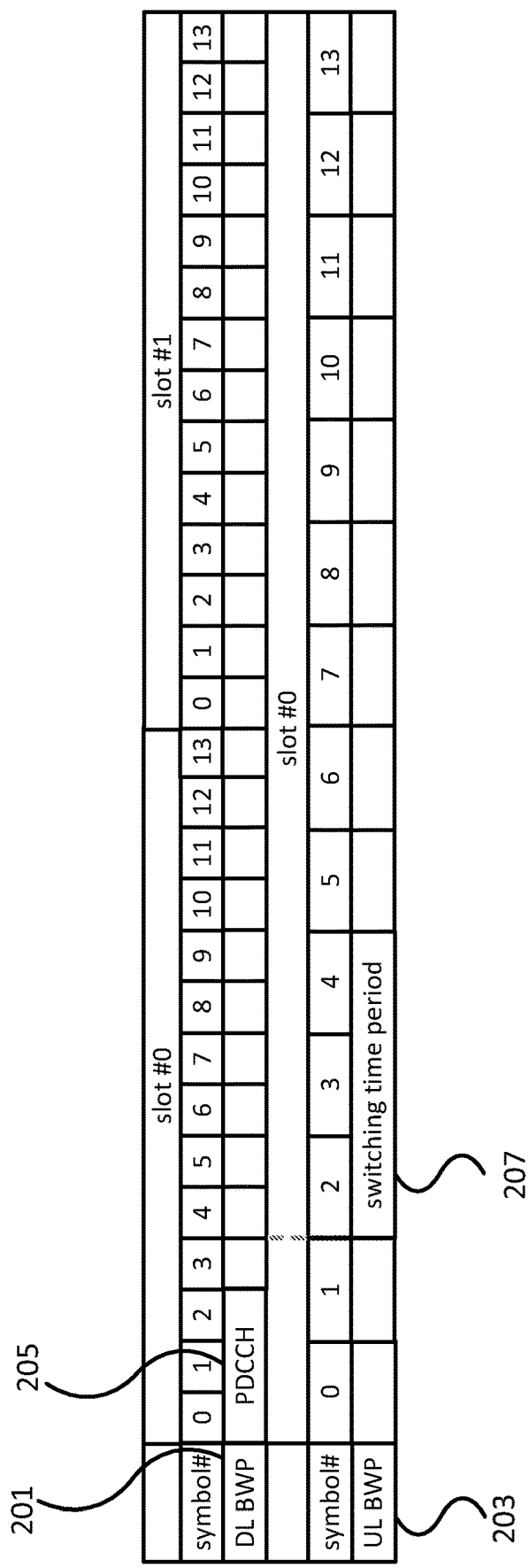
FIG. 2 is a schematic diagram illustrating that the starting symbol of a switching time period aligns with a symbol boundary in an active UL BWP according to an example implementation of the present disclosure.

FIG. 2 is a schematic diagram illustrating that the starting symbol of a switching time period aligns with a symbol boundary in an active UL BWP according to an example implementation of the present disclosure. As illustrated in FIG. 2, if a UE is provided with the active DL BWP 201 with the SCS configuration $\mu_{UL}$ and the active UL BWP 203 with the SCS configuration $\mu_{UL}$, and the SCS configuration $\mu_{UL}$ is larger than the SCS configuration $\mu_{UL}$, the end of a DL reception (e.g., PDCCH reception 205) in the active DL BWP 201 may not align with a symbol boundary in the active UL BWP 203. In this circumstance, the starting symbol of a switching time period 207 may align with a symbol boundary in the active UL BWP 203.

In the circumstances as illustrated in FIG. 1 and FIG. 2, which symbol in the active UL BWP (e.g., symbol #1 or symbol #2 in the active UL BWP) should be scheduled as the starting symbol of the switching time period may lead to ambiguity. Thus, the starting symbol of the switching time period may need to be defined.

Figure 3:
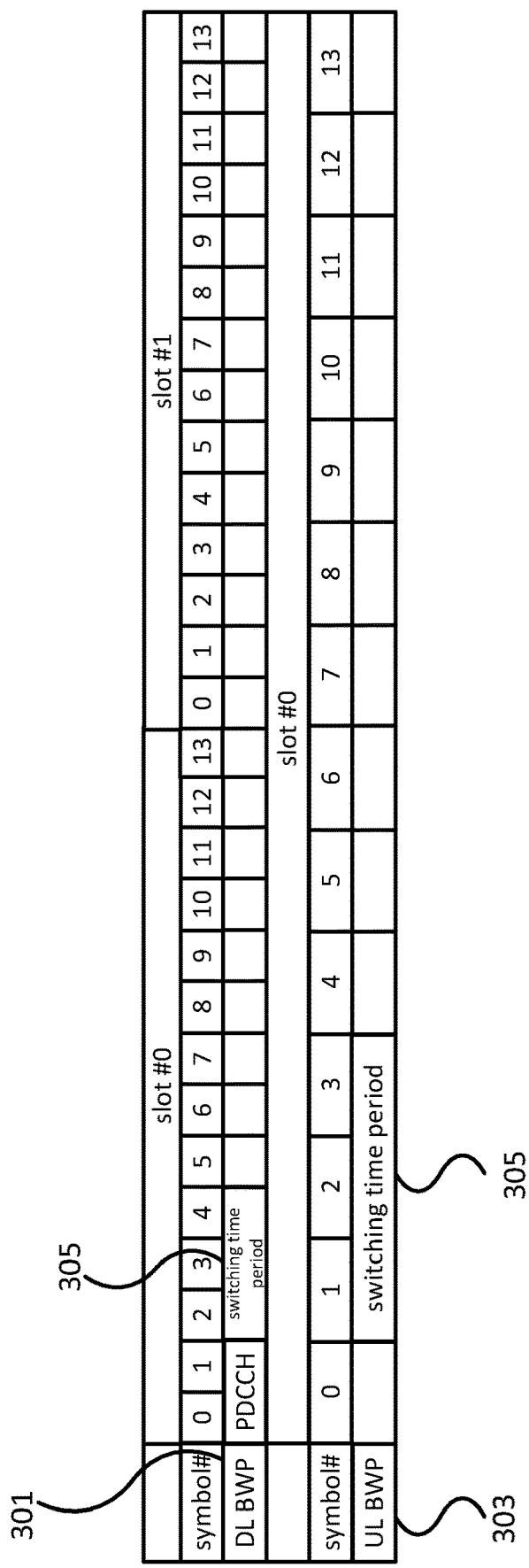
FIG. 3 is a schematic diagram illustrating that the switching time period is different based on the different SCS configurations according to an example implementation of the present disclosure.

FIG. 3 is a schematic diagram illustrating that the switching time period is different based on the different SCS configurations according to an example implementation of the present disclosure. As illustrated in FIG. 3, if a UE is provided with the active DL BWP 301 with the SCS configuration $\mu_{UL}$ and the active UL BWP 303 with the SCS configuration $\mu_{UL}$, and the SCS configuration $\mu_{UL}$ and the SCS configuration $\mu_{UL}$ are different, which SCS configuration (e.g., the SCS configuration $\mu_{UL}$ of the active DL BWP 301 or the SCS configuration $\mu_{UL}$ of the active UL BWP 303) is the reference for a switching time period 305 may remain unclear. For example, if the SCS configuration $\mu_{DL}=1$ and the SCS configuration $\mu_{UL}=0$, and 3 symbols for the switching time period 305 is provided, the absolute time for the switching time period 305 may become different while applying different SCS configurations for the switching time period 305. On the other hand, if the SCS configuration $\mu_{DL}=1$ and the SCS configuration $\mu_{UL}=0$, and an absolute time for the switching time period 305 is provided, the number of symbols on the active UL BWP 303 and the active DL BWP 301 will be different, then the scheduling ambiguity may arise.

To solve the problems as illustrated in FIGS. 1 to 3, the starting symbol of the switching time period may be defined and the SCS configuration for the switching time period may be defined. The switching time period may start from the end of last symbol of a DL reception or an UL transmission with larger SCS configuration no matter whether the starting symbol of the switching time period aligns with the symbol boundary of an active BWP with smaller SCS configuration or not. After the end of a DL reception or an UL transmission on the active BWP with larger SCS configuration, the switching time period may start from the first symbol with an aligned symbol boundary between different active BWPs with different SCS configurations. A value K indicating a gap between the end of a transmission and the first symbol of the switching time period may be defined, value K may be different corresponding to different SCS configurations. The SCS configuration applied to the switching time period may be the SCS configuration $\mu_{UL}$ for an active UL BWP. The SCS configuration applied to the switching time period may be the SCS configuration $\mu_{DL}$ for an active DL BWP. The SCS configuration applied to the switching time period may be the minimum or smallest SCS configuration among the active BWPs. The SCS configuration applied to the switching time period may be the maximum or largest SCS configuration $\mu_{max}$ among the active BWPs.

I. Starting Point of Switching Time

Figure 4:
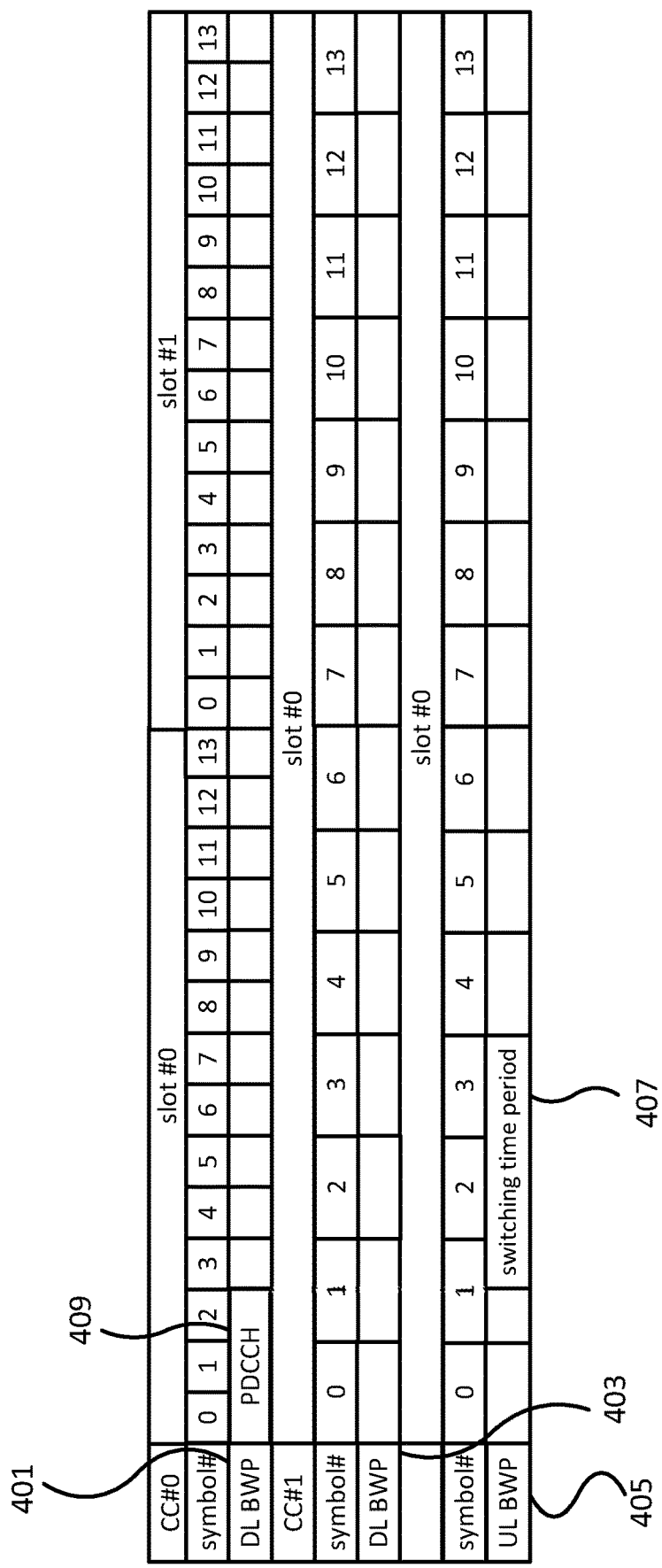
FIG. 4 is a schematic diagram illustrating that the starting symbol of a switching time period is started from the end of a last symbol of a physical downlink control channel (PDCCH) corresponding to an active downlink (DL) BWP with the largest sub-carrier spacing (SCS) configuration according to an example implementation of the present disclosure.

In some implementations, the starting symbol of the switching time period may be started from the end of the last symbol of a DL reception or/and an UL transmission corresponding to the active BWP with the largest SCS configuration. FIG. 4 is a schematic diagram illustrating that the starting symbol of a switching time period is started from the end of a last symbol of a physical downlink control channel (PDCCH) corresponding to an active DL BWP with the largest SCS configuration according to an example implementation of the present disclosure. As illustrated in FIG. 4, if a UE is provided with the active DL BWP 401 with the SCS configuration $\mu=1$, the active DL BWP 403 with the SCS configuration $\mu=0$, and the active UL BWP 405 with the SCS configuration $\mu=0$, the starting symbol of the switching time period 407 may be started from the end of the last symbol of a DL reception (e.g., the PDCCH reception 409) corresponding to the active DL BWP 401 with the largest SCS configuration $\mu=1$. In some implementations, the starting symbol of the switching time period may be started from the end of the last symbol of a DL reception or/and an UL transmission corresponding to the active BWP with the largest SCS configuration when the last transmission/reception before the switching direction is a dynamically scheduled transmission/reception and the first transmission/reception after the switching direction is a configured transmission/reception.

In some implementations, the starting symbol of the switching time period may depend on the starting symbol of the earliest symbol with a configured/scheduled transmission/reception which has a different transmission direction from the previous scheduling. The configured/scheduled transmission may be an UL transmission, and the previous scheduling may be a DL reception (e.g., a PDCCH reception). Specifically, the switching time period may be started from the symbol which is several symbols earlier than the starting symbol of the earliest transmission. The switching time period may use the target BWP as reference. The switching time period may use the active UL BWP as reference. The switching time period may be regarded as a part of the UL transmission. In some implementations, the starting symbol of the switching time period may depend on the starting symbol of the earliest symbol with a configured/scheduled transmission/reception which has a different transmission direction from the previous scheduling when the last transmission/reception before the switching direction is a configured transmission/reception and the first transmission/reception after the switching direction is a dynamically scheduled transmission/reception, or when the last transmission/reception before the switching direction and the first transmission/reception after the switching direction are both dynamically scheduled transmission/reception or are both configured transmission/reception.

In some implementations, the starting symbol of the switching time period may depend on the starting symbol of the earliest symbol with a configured/scheduled transmission/reception which has a different transmission direction from the previous scheduling. The configured/scheduled transmission may be an UL transmission, and the previous scheduling may be a DL reception (e.g., a PDCCH reception). Specifically, the switching time period may be started from the symbol which is a number of symbols earlier than the starting symbol of the earliest transmission, and the number of symbols is the smallest number of symbols greater than a duration of the switching time period plus a timing advance (TA) time period.

The starting symbol of the switching time period may correspond to the first symbol after the symbol in an active UL/DL BWP which overlaps with the last symbol of the transmission/reception in an active UL/DL BWP with the largest SCS configuration.

If the collision between the configured receptions/transmissions and the switching time period occurs, the UE may perform the switching and may omit the configured receptions/transmissions. The configured reception may be a synchronization signal block (SSB), a channel status information-reference signal (CSI-RS) or a semi persistent scheduling-physical downlink shared channel (SPS-PDSCH), and the configured transmission may be a physical uplink control channel (PUCCH), a sounding reference signal (SRS) or a configured grant-physical uplink shared channel (CG-PUSCH). The UE may not be dynamically scheduled with a reception/transmission that overlaps with the switching time period.

When determining whether a DL reception before the switching direction is colliding with a switching time period, the TA time period is applied to the switching time period. When determining whether an UL transmission after the switching direction is colliding with a switching time period, the TA time period is not applied to the switching time period. When determining whether an UL transmission before the switching direction is colliding with a switching time period, the TA time period is not applied to the switching time period. When determining whether a DL reception after the switching direction is colliding with a switching time period, the TA time period is applied to the switching time period.

The end of a last symbol of the DL reception or/and the UL transmission may not align with the symbol/slot/sub-slot boundary of the transmission/reception in other active BWPs. The active BWP may be the original BWP or/and the target BWP. The active BWP may be a BWP between the original BWP and the target BWP.

Figure 5:
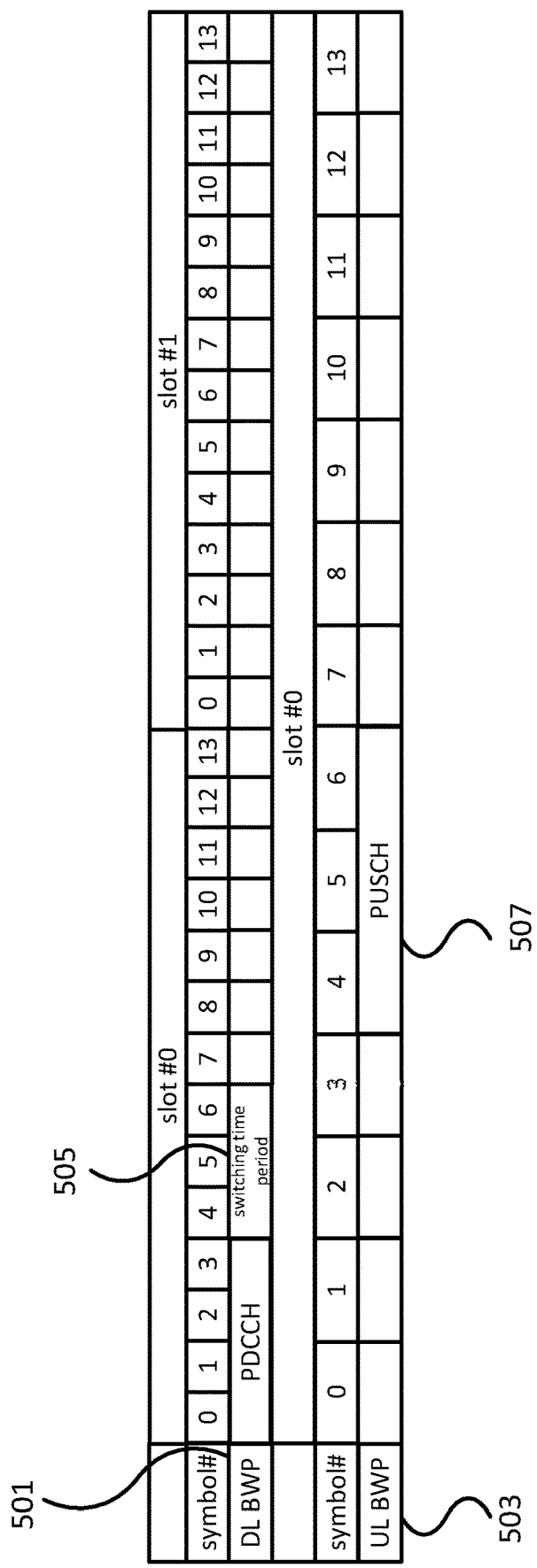
FIG. 5 is a schematic diagram illustrating that the starting symbol of the transmission/reception is configured/scheduled in the symbol with an aligned symbol boundary after the switching time period according to an example implementation of the present disclosure.

FIG. 5 is a schematic diagram illustrating that the starting symbol of the transmission/reception is configured/scheduled in the symbol with an aligned symbol boundary after the switching time period according to an example implementation of the present disclosure. As illustrated in the FIG. 5, if the switching time period 505 is configured in the original BWP (e.g., the active DL BWP 501) with the SCS configuration μ=1, and the ending symbol of switching time period 505 does not correspond to the symbol boundary of the target BWP (e.g., the active UL BWP 503) with the SCS configuration μ=0, the starting symbol of the transmission/reception (e.g., the PUSCH transmission 507) may be configured/scheduled in the symbol with an aligned symbol boundary after the switching time period 505. In some implementations, the starting symbol of the transmission/reception (e.g., the PUSCH transmission 507) may not need to be configured/scheduled in the symbol with an aligned symbol boundary after the switching time period 505.

If the starting symbol of the transmission/reception is configured/scheduled in the symbol with aligned symbol boundary after the switching time period, the switching time period may be considered as a variable time that may be required to be larger than a pre-determined/(pre-)configured/indicated value. The switching time period may be started from the active BWP with larger transmission unit (e.g., slot>sub-slot>symbol). The switching time period may be started from the active BWP with smaller transmission unit (e.g., slot>sub-slot>symbol). The end of a last symbol of the DL reception or/and the UL transmission may align with the symbol/slot/sub-slot boundary of the transmission/reception in other active BWPs. The active BWP may be a reference BWP, and the starting symbol of the switching time period may be defined/determined based on the reference BWP. The reference BWP may be (pre-)configured/indicated, or pre-determined (e.g., the active BWP of the lowest component carrier (CC) index or the active BWP of special cell (SPCell)). The reference BWP may be the active BWP of a configured CC with largest SCS configuration.

Figure 6:
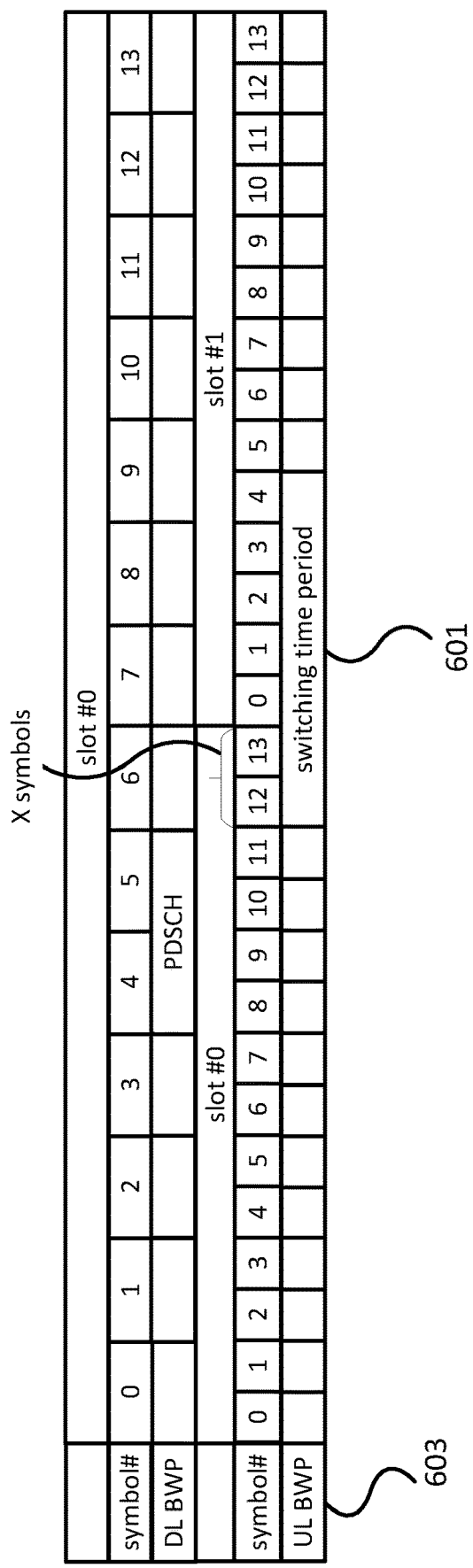
FIG. 6 is a schematic diagram illustrating that a switching time period is configured starting from the last X symbols of a slot in the target BWP according to an example implementation of the present disclosure.

If the starting symbol of the switching time period corresponds to the last X symbols of a slot in the target BWP, the switching time period may be determined to cross a slot boundary; otherwise, the switching time period may not be determined to cross a slot boundary. FIG. 6 is a schematic diagram illustrating that a switching time period is configured starting from the last X symbols (X=2) of a slot in the target BWP according to an example implementation of the present disclosure. As illustrated in the FIG. 6, if the starting symbol of the switching time period 601 corresponds to the last X symbols (e.g., X=2) of a slot in the target BWP (e.g., slot #0 in the UL BWP 603), the switching time period 601 may be determined to cross a slot boundary; otherwise, the switching time period 601 may not be determined to cross a slot boundary. Whether to cross the boundary may be configured or/and indicated. X may be a pre-defined value. X may be configured by a radio resource control (RRC) message. X may be reported by UE capability. X may be dynamically indicated. In some implementations, the switching time period may not be configured to cross a slot boundary.

Figure 7:
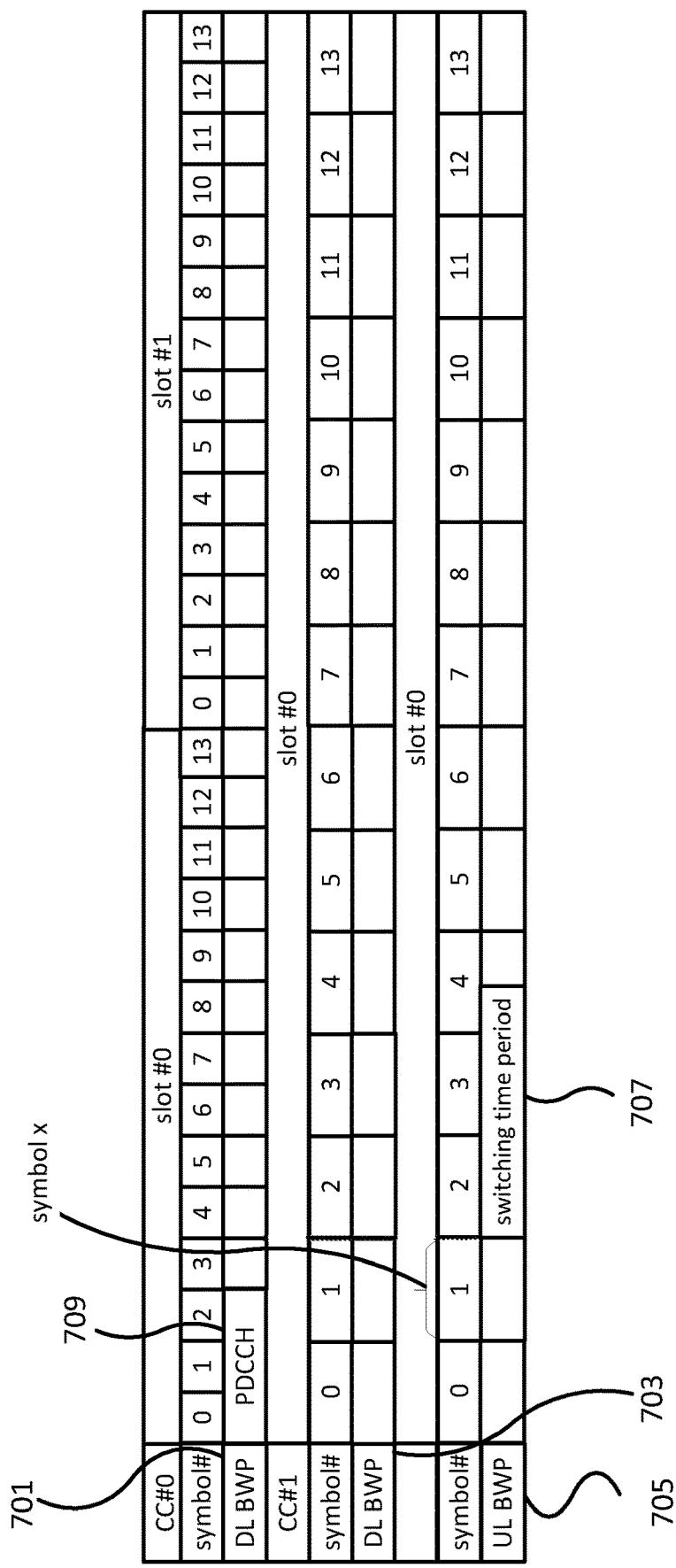
FIG. 7 is a schematic diagram illustrating that the starting symbol of a switching time period corresponds to the active BWP with smallest SCS according to an example implementation of the present disclosure.

In some implementations, the starting symbol of the switching time period may correspond to the first symbol after a symbol (e.g., symbol x) of the active BWP with the smallest SCS configuration, and the symbol x1 overlaps with the last symbol of the DL reception or/and UL transmission before the switching direction. FIG. 7 is a schematic diagram illustrating that the starting symbol of a switching time period corresponds to the active BWP with smallest SCS according to an example implementation of the present disclosure. As illustrated in FIG. 7, if a UE is provided with the active DL BWP 701 with the SCS configuration μ=1, the active DL BWP 703 with the SCS configuration μ=0, and the active UL BWP 705 with the SCS configuration μ=0, the starting symbol of the switching time period 707 may correspond to the first symbol (e.g., symbol #2) after a symbol (e.g., symbol x) of the active UL BWP 705 with the smallest SCS configuration μ=0, and the symbol x1 overlaps with the last symbol of a DL reception (e.g., the PDCCH reception 709) before switching direction. In some implementations, the starting symbol of the switching time period may correspond to the first symbol after a symbol (e.g., symbol x) of the active BWP with the smallest SCS configuration, and the symbol x overlaps with the last symbol of the DL reception or/and UL transmission before the switching direction when the last transmission/reception before the switching direction is a dynamically scheduled transmission/reception and the first transmission/reception after the switching direction is a configured transmission/reception.

The starting symbol of the switching time period may be started from the beginning of a symbol/sub-slot/slot in the target BWP with an aligned boundary. Specifically, the symbol/sub-slot/slot where the switching time period begins may be in the first symbol after the end of a last symbol of the DL reception or/and UL transmission in the original BWP.

Figure 8:
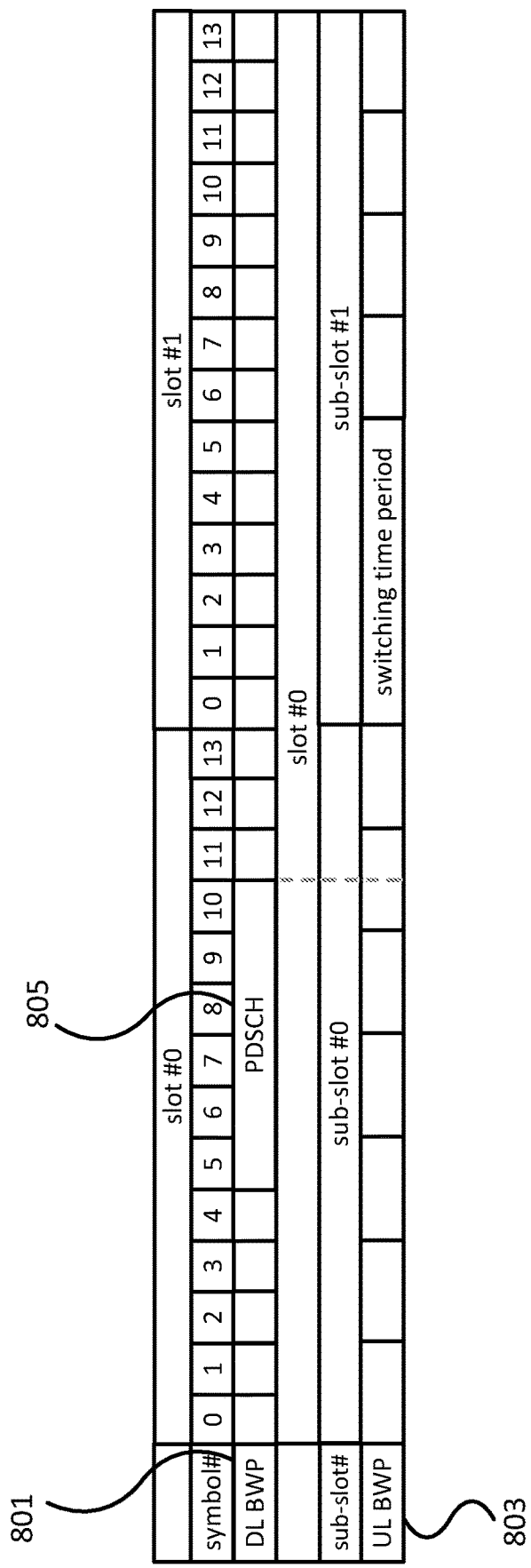
FIG. 8 is a schematic diagram illustrating that the end of a last symbol of the DL reception in the original BWP does not align with the symbol/slot/sub-slot boundary of the UL transmission in the target BWP according to an example implementation of the present disclosure.

In some implementations, the end of a last symbol of the DL reception or/and UL transmission in the original BWP may not align with the symbol/slot/sub-slot boundary of the transmission/reception in the target BWP. FIG. 8 is a schematic diagram illustrating that the end of a last symbol of the DL reception in the original BWP does not align with the symbol/slot/sub-slot boundary of the UL transmission in the target BWP according to an example implementation of the present disclosure. As illustrated in FIG. 8, if the original BWP (e.g., the active DL BWP 801) with a SCS configuration µ=1 and the target BWP (e.g., the active UL BWP 803) with a SCS configuration µ=0 are configured with different scheduling units, the end of a last symbol of the DL reception (e.g., the PDSCH reception 805) in the original BWP may not align with the symbol/slot/sub-slot boundary of the UL transmission in the target BWP.

If the starting symbol of the switching time period corresponds to the last X symbols of a slot in the target BWP, the switching time period may be determined to cross a slot boundary; otherwise, the switching time period may not be determined to cross a slot boundary. Whether to cross the boundary may be configured or/and indicated. X may be a pre-defined value. X may be configured by a RRC message. X may be reported by UE capability. X may be dynamically indicated. In some implementations, the switching time period may not be configured to cross a slot boundary.

In some implementations, the switching time period may be started at the beginning of the first symbol with a fixed/pre-defined SCS configuration for a frequency range (FR) (e.g., 15 kHz for FR1 and 60 kHz for FR2), after the last symbol of the end of a DL reception or/and an UL transmission before the switching direction.

In some implementations, a value K indicating a gap may be indicated/defined between the end of a transmission and the first symbol of the switching time period or between the end of the switching time period and the starting symbol of a transmission/reception after switching the transmission direction, value K may or may not be different corresponding to different SCS configurations. The value K may be determined based on the configured/indicated value corresponding to the active BWP with largest SCS configuration. The value K may be determined based on the configured/indicated value corresponding to the active BWP with smallest SCS configuration. The value K may be determined based on the indicated value corresponding to the active BWP where the indicator is detected. The value K may be activated or/and deactivated based on some conditions. The condition may be referred to as a specific configuration. The condition may be referred to as a specific parameter. The condition may be referred to as an invalid symbol pattern. The value K may be an absolute value (e.g., in millisecond, microsecond unit) regardless of the applied SCS configuration. The value K may be a variable value based on different SCS configurations or based on whether a symbol boundary between BWPs of different CCs is aligned. The value K may be regarded as a part of the switching time period. The value K may include the PDCCH decoding time, the TA time period, or/and the configured reception/transmission symbols.

Each active BWP may have a priority or/and a configured order, and the priority may be used to determine where the starting symbol of the switching time period is configured or/and which SCS configuration the switching time period is applied. The priority index may be configured in the BWP configuration. The priority index with higher value may be referred to as a high priority. The priority index with lower value may be referred to as a low priority.

II. Length of Switching Time Period

The length of the switching time period may be defined in number of symbols, which may be the same or different for each BWP depending on the SCS of the applied BWPs, and the length of the switching time period may be defined based on the SCS configuration $\mu_{UL}$ for an active UL BWP. The SCS configuration $\mu_{UL}$ may refer to the SCS configuration for the switching time period.

Figure 9:
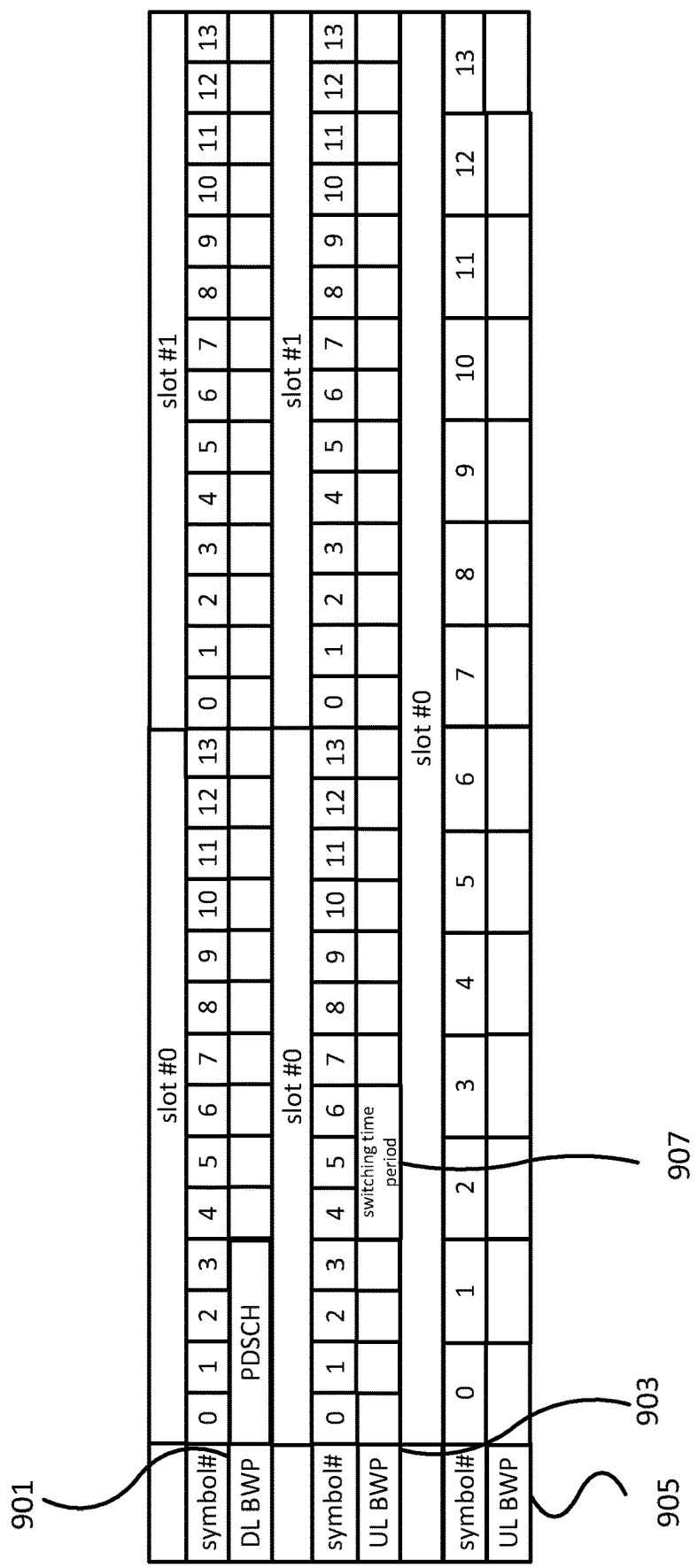
FIG. 9 is a schematic diagram illustrating that the length of a switching time period is determined based on the active UL BWP with the largest SCS configuration according to an example implementation of the present disclosure.

The SCS configuration $\mu_{UL}$ may correspond to the largest SCS configuration among the SCS configurations (e.g., $\mu_{UL1}$, $\mu_{UL2}$, $\mu_{UL3}$, . . . ) for all active UL BWPs of the configured CCs. That is, $\mu_{UL}$=max ($\mu_{UL1}$, $\mu_{UL2}$, $\mu_{UL3}$, . . . ). FIG. 9 is a schematic diagram illustrating that the length of a switching time period is determined based on the active UL BWP with the largest SCS configuration according to an example implementation of the present disclosure. As illustrated in FIG. 9, if a UE is provided with the active DL BWP 901 with the SCS configuration µ=1, the active UL BWP 903 with the SCS configuration $\mu_{UL1}$=1, and the active UL BWP 905 with the SCS configuration $\mu_{UL2}$=0, the length of the switching time period 907 may be determined based on the active UL BWP 903 with the larger SCS configuration $\mu_{UL1}$=1 between the active UL BWP 903 and the active UL BWP 905. If more than one active UL BWPs are provided, the length of the switching time period may be determined based on the active UL BWP with the largest SCS configuration among the SCS configurations (e.g., $\mu_{UL1}$, $\mu_{UL2}$, $\mu_{UL3}$, . . . ) for the more than one active UL BWPs.

Figure 10:
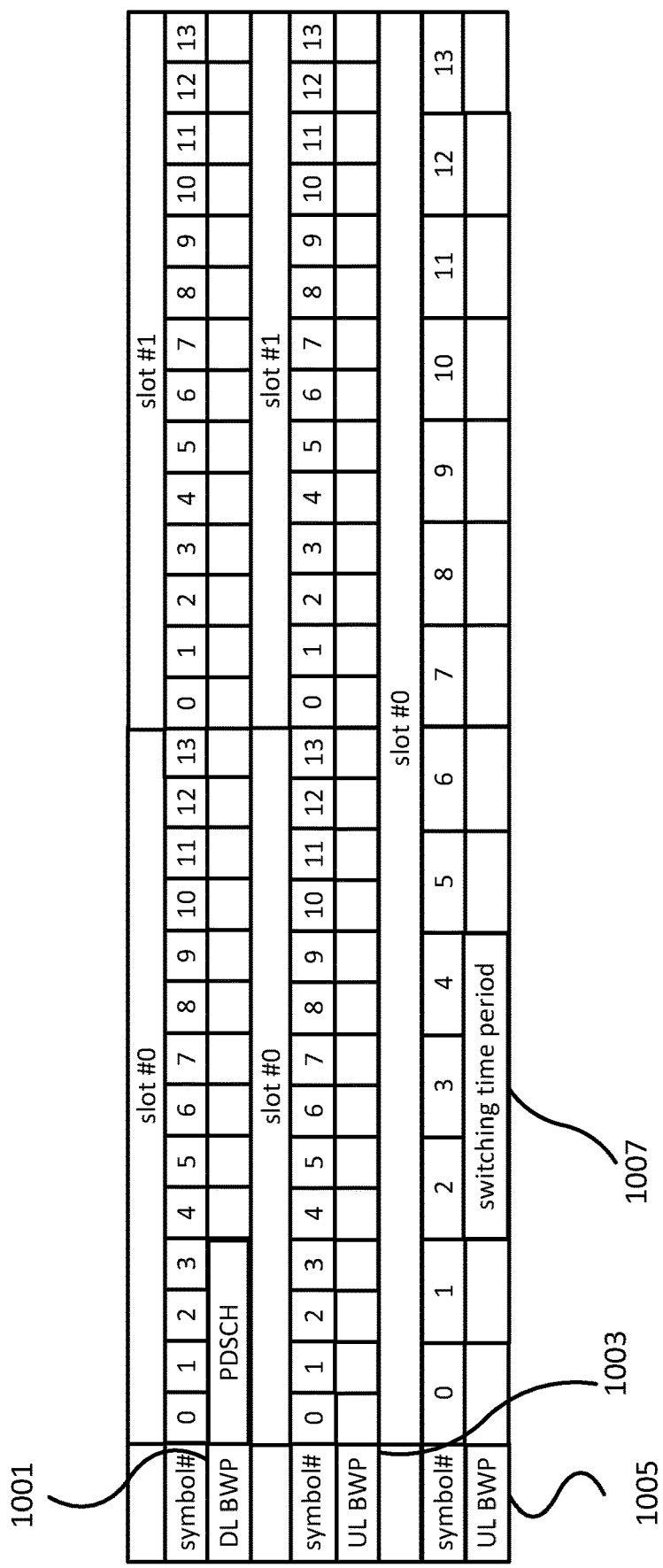
FIG. 10 is a schematic diagram illustrating that the length of a switching time period is determined based on the active UL BWP with the smallest SCS configuration according to an example implementation of the present disclosure.

The SCS configuration $\mu_{UL}$ may correspond to the smallest SCS configuration among the SCS configurations (e.g., $\mu_{UL1}$, $\mu_{UL2}$, $\mu_{UL3}$, . . . ) for all active UL BWPs of the configured CCs. That is, $\mu_{UL}$=min ($\mu_{UL1}$, $\mu_{UL2}$, $\mu_{UL3}$, . . . ). FIG. 10 is a schematic diagram illustrating that the length of a switching time period is determined based on the active UL BWP with the smallest SCS configuration according to an example implementation of the present disclosure. As show in FIG. 10, if a UE is provided with the active DL BWP 1001 with the SCS configuration µ=1, the active UL BWP 1003 with the SCS configuration $\mu_{UL1}$=1, and the active UL BWP 1005 with the SCS configuration $\mu_{UL2}$=0, the length of the switching time period 1007 may be determined based on the active UL BWP 1005 with the smaller SCS configuration $\mu_{UL2}$=0 between the active UL BWP 1003 and the active UL BWP 1005. If more than one active UL BWPs are provided, the length of the switching time period may be determined based on the active UL BWP with the smallest SCS configuration among the SCS configurations (e.g., $\mu_{UL1}$, $\mu_{UL2}$, $\mu_{UL3}$, . . . ) for all active UL BWPs.

The SCS configuration $\mu_{UL}$ may correspond to the smallest SCS configuration among the SCS configurations (e.g., $\mu_{UL1}, \mu_{UL2}, \mu_{UL3}, \ldots$) for all configured UL BWPs of the CCs in which UL transmission are performed after the switching direction. That is, $\mu_{UL}=\min$ ($\mu_{UL1}, \mu_{UL2}, \mu_{UL3}, \ldots$). The SCS configuration $\mu_{UL}$ may correspond to the smallest SCS configuration among the SCS configurations (e.g., $\mu_{UL1}, \mu_{UL2}, \mu_{UL3}, \ldots$) provided in scs-SpecificCarrierList of FrequencyInfoUL or FrequencyInfoUL-SIB of the CCs in which UL transmission are performed after the switching direction. That is, $\mu_{UL}=\min$ ($\mu_{UL1}, \mu_{UL2}, \mu_{UL3}, \ldots$). The SCS configuration $\mu_{UL}$ may correspond to the smallest SCS configuration among the SCS configurations (e.g., $\mu_{UL1}, \mu_{UL2}, \mu_{UL3}, \ldots$) for all configured UL BWPs of the configured CCs. That is, $\mu_{UL}=\min$ ($\mu_{UL1}, \mu_{UL2}, \mu_{UL3}, \ldots$). The SCS configuration $\mu_{UL}$ may correspond to the smallest SCS configuration among the SCS configurations (e.g., $\mu_{UL1}, \mu_{UL2}, \mu_{UL3}, \ldots$) provided in scs-SpecificCarrierList of FrequencyInfoUL or FrequencyInfoUL-SIB of the configured CCs. That is, $\mu_{UL}=\min$ ($\mu_{UL1}, \mu_{UL2}, \mu_{UL3}, \ldots$).

Figure 11:
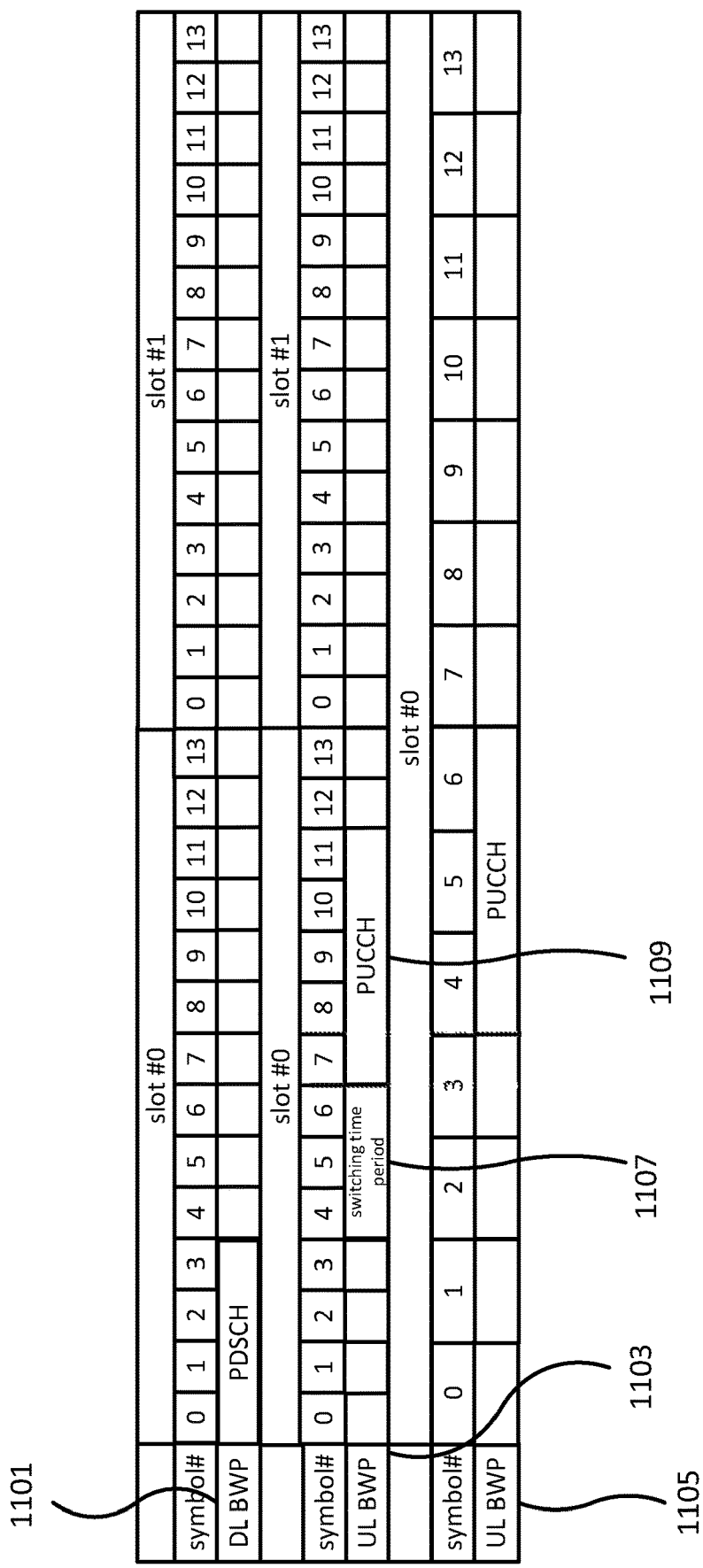
FIG. 11 is a schematic diagram illustrating that the length of a switching time period is determined based on the active UL BWP with the earliest transmission after the switching time period according to an example implementation of the present disclosure.

In some implementations, the SCS configuration $\mu_{UL}$ may correspond to the SCS configuration for the UL active BWP where the earliest configured/scheduled transmission is performed after the switching time period. FIG. 11 is a schematic diagram illustrating that the length of a switching time period is determined based on the active UL BWP with the earliest transmission after the switching time period according to an example implementation of the present disclosure. As illustrated in FIG. 11, if a UE is provided with the active DL BWP 1101 with the SCS configuration $\mu=1$, the active UL BWP 1103 with the SCS configuration $\mu=1$, and the active UL BWP 1105 with the SCS configuration $\mu=0$, the SCS configuration $\mu_{UL}$ may correspond to the SCS configuration $\mu=1$ for the active UL BWP 1103 with earliest transmission (e.g., the PUCCH transmission 1109) after the switching time period 1107, and the length of the switching time period 1107 may be determined based on the active UL BWP 1103 with the earliest transmission (e.g., the PUCCH transmission 1109) after the switching time period. In some implementations the SCS configuration $\mu_{UL}$ may correspond to the SCS configuration for the UL active BWP where the latest configured/scheduled transmission is performed before the switching time period 1107.

The length of the switching time period may be defined in number of symbols, which may be the same or different for each BWP depending on the SCS of the applied BWPs, and the length of the switching time period may be defined based on the SCS configuration μDL for an active DL BWP. The SCS configuration $\mu_{DL}$ may refer to the SCS configuration for switching time period.

The SCS configuration $\mu_{DL}$ may correspond to the largest SCS configuration among the SCS configurations (e.g., $\mu_{DL1}, \mu_{DL2}, \mu_{DL3}, \ldots$) for all DL active BWPs of the configured CCs. That is, $\mu_{DL}=\max$ ($\mu_{DL1}, \mu_{DL2}, \mu_{DL3}, \ldots$). The SCS configuration $\mu_{DL}$ may correspond to the smallest SCS configuration among the SCS configurations (e.g., $\mu_{DL1}, \mu_{DL2}, \mu_{DL3}, \ldots$) for all DL active BWPs of the configured CCs. That is, $\mu_{DL}=\min$ ($\mu_{DL1}, \mu_{DL2}, \mu_{DL3}, \ldots$). The SCS configuration μDL may correspond to the smallest SCS configuration among the SCS configurations (e.g., $\mu_{DL1}, \mu_{DL2}, \mu_{DL3}, \ldots$) for all configured DL BWPs of the CCs in which DL reception are performed before the switching direction. That is, $\mu_{DL}=\min$ ($\mu_{DL1}, \mu_{DL2}, \mu_{DL3}, \ldots$). The SCS configuration $\mu_{DL}$ may correspond to the smallest SCS configuration among the SCS configurations (e.g., $\mu_{DL1}, \mu_{DL2}, \mu_{DL3}, \ldots$) provided in scs-SpecificCarrierList of FrequencyInfoDL or FrequencyInfoDL-SIB of the CCs in which DL reception are performed before the switching direction. That is, $\mu_{DL}=\min$ ($\mu_{DL1}, \mu_{DL2}, \mu_{DL3}, \ldots$). The SCS configuration μDL may correspond to the smallest SCS configuration among the SCS configurations (e.g., $\mu_{DL1}, \mu_{DL2}, \mu_{DL3}, \ldots$) between all configured DL BWPs of the configured CCs. That is, $\mu_{DL}=\min$ ($\mu_{DL1}, \mu_{DL2}, \mu_{DL3}, \ldots$). The SCS configuration $\mu_{DL}$ may correspond to the smallest SCS configuration among the SCS configurations (e.g., $\mu_{DL1}, \mu_{DL2}, \mu_{DL3}, \ldots$) provided in scs-SpecificCarrierList of FrequencyInfoDL or FrequencyInfoDL-SIB of the configured CCs. That is, $\mu_{DL}=\min$ ($\mu_{DL1}, \mu_{DL2}, \mu_{DL3}, \ldots$). The SCS configuration $\mu_{DL}$ may correspond to the SCS configuration for the DL active BWP where the earliest configured/scheduled reception is performed after the switching time period.

Figure 12:
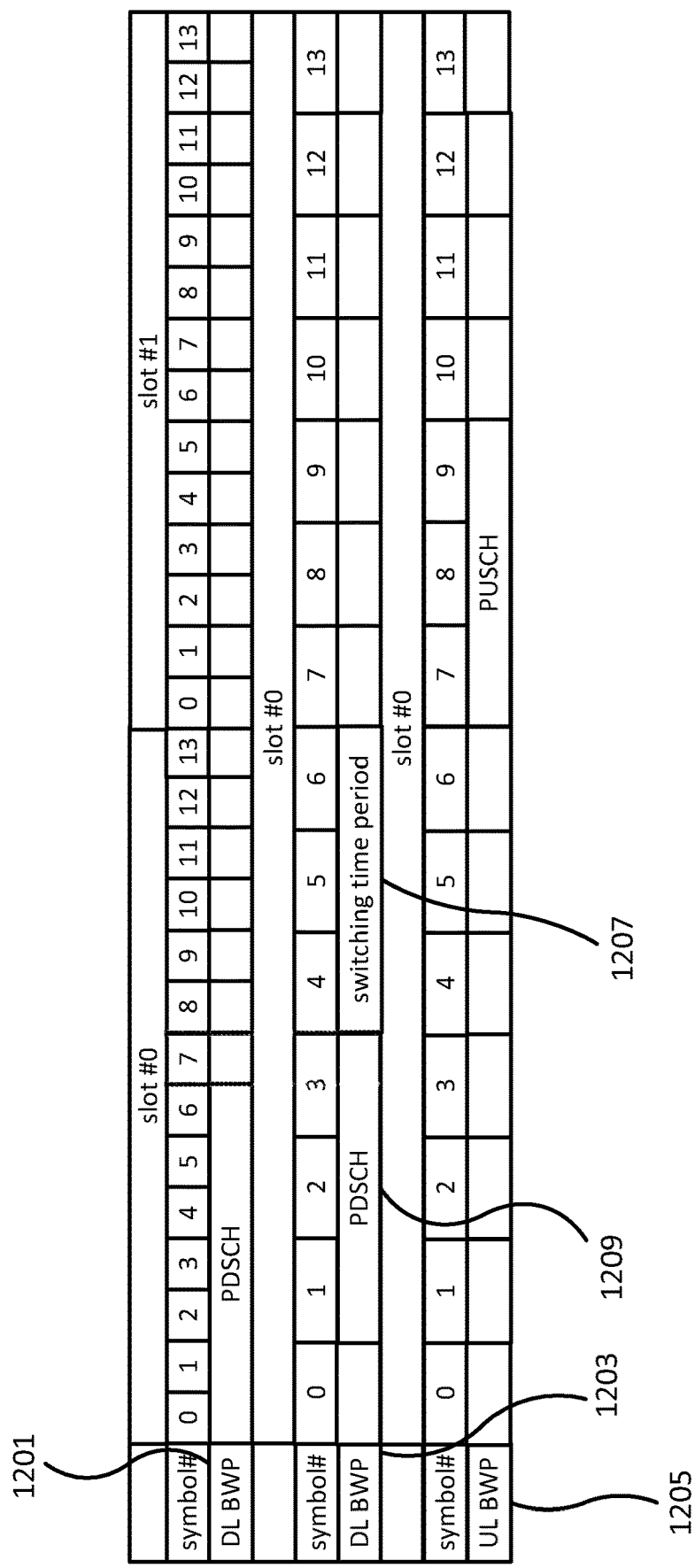
FIG. 12 is a schematic diagram illustrating that the length of a switching time period is determined based on the active DL BWP with the latest reception before the switching time period according to an example implementation of the present disclosure.

In some implementations, the SCS configuration $\mu_{DL}$ may correspond to the SCS configuration for the DL active BWPs where the latest configured/scheduled reception are performed before the switching time period. FIG. 12 is a schematic diagram illustrating that the length of a switching time period is determined based on the active DL BWP with the latest reception before the switching time period according to an example implementation of the present disclosure. As illustrated in FIG. 12, if a UE is provided with the active DL BWP 1201 with the SCS configuration $\mu=1$, the active DL BWP 1203 with the SCS configuration $\mu=0$, and the active UL BWP 1205 with the SCS configuration $\mu=0$, the SCS configuration $\mu_{DL}$ may correspond to the SCS configuration $\mu=0$ for the active UL BWP 1203 with the latest reception (e.g., the PDSCH reception 1209) before the switching time period 1207, and the length of the switching time period 1207 may be determined based on the active DL BWP 1203 with the latest reception (e.g., the PDSCH reception 1209) before the switching time period 1207.

The SCS configuration applied to the length of the switching time period may correspond to the SCS configuration μ for an active BWP. The SCS configuration μ may correspond to the largest SCS configuration among the SCS configuration (e.g., $\mu1, \mu2, \mu3, \ldots$) for all active BWPs. That is, $\mu=\max$ ($\mu1, \mu2, \mu3, \ldots$). The SCS configuration μ may correspond to the smallest SCS configuration among the SCS configuration (e.g., $\mu1, \mu2, \mu3, \ldots$) for all active BWPs. That is, $\mu=\min$ ($\mu1, \mu2, \mu3, \ldots$).

If the configured scheduling is in different units (e.g., symbol, sub-slot, or slot), the SCS configuration μ applied to the length of the switching time period may be dependent on which unit the scheduling is applied. The SCS configuration μ may correspond to the BWP with scheduling in larger unit (e.g., slot>sub-slot>symbol). For example, if a DL reception with SCS μDL is in symbol unit and an UL transmission with SCS $\mu_{UL}$ is in sub-slot unit, the μ applied to the switching time period may be the $\mu_{UL}$. The SCS configuration μ may correspond to the BWP with scheduling in smaller unit (e.g., slot>sub-slot>symbol). For example, if a DL reception with SCS $\mu_{DL}$ is in symbol unit and an UL transmission with SCS $\mu_{UL}$ is in sub-slot unit, the μ applied to the switching time period may be the $\mu_{DL}$.

The SCS configuration applied to the length of the switching time period may be dynamically indicated or/and configured by higher layer. The indication may be a new downlink control information (DCI) format, a new field in existing DCI formats, a new medium access control-control element (MAC-CE) or/and a new field in MAC-CE. The SCS may be configured in a dedicated configuration for scheduling half-duplex (HD) operation. The SCS may be configured by a new parameter in existing configuration. For example, the configuration may be a time division duplex (TDD) configuration.

The switching time period may be an absolute value. For example, the switching time period may not be in symbol unit but in a millisecond (ms) or microsecond (μs) unit.

Figure 13:
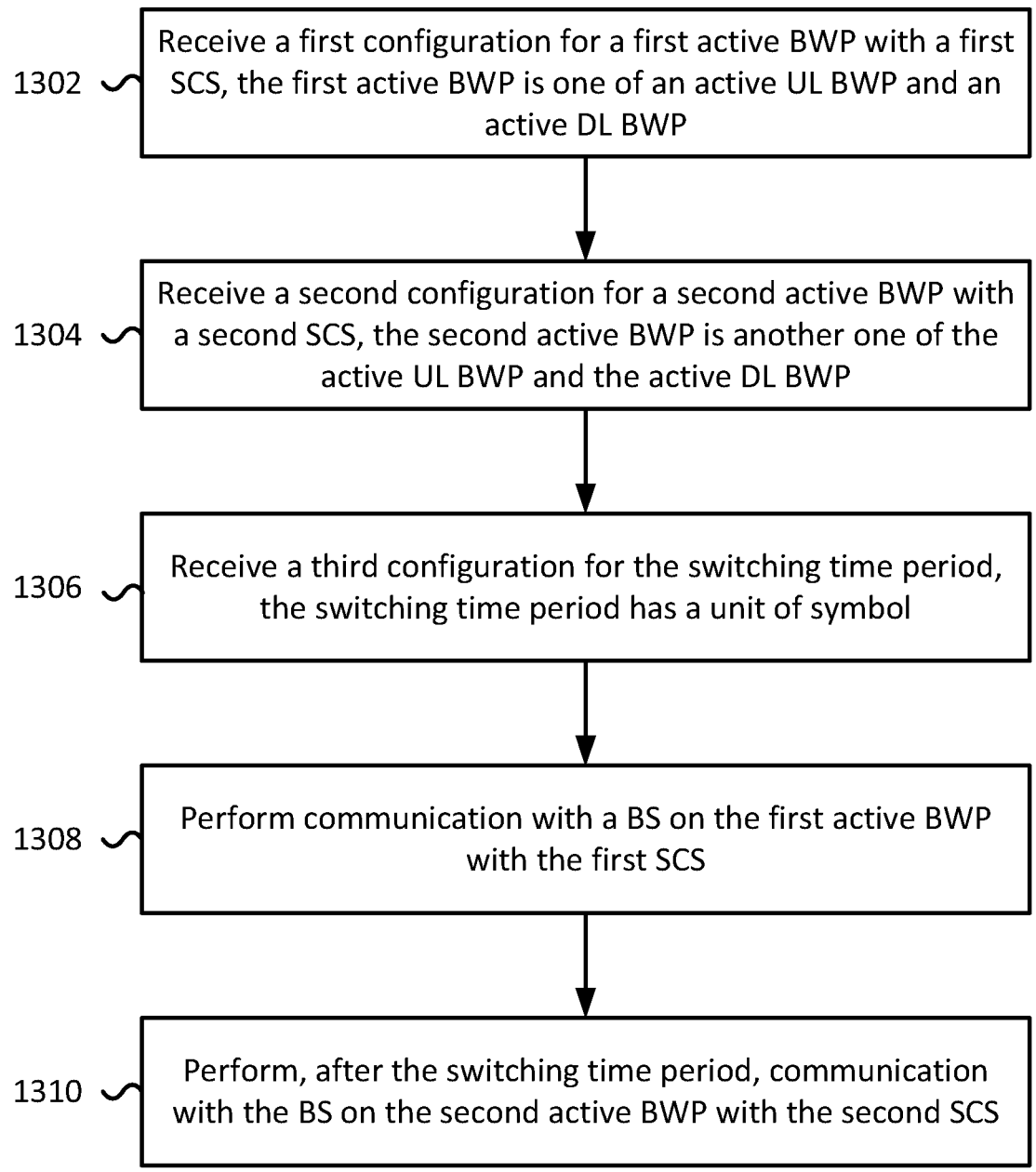
FIG. 13 is a flowchart illustrating a method performed by a UE for handling a switching time period of DL-UL switching for half duplex-frequency division duplex (HD-FDD) operation according to an example implementation of the present disclosure.

FIG. 13 is a flowchart illustrating a method 1300 performed by a UE for handling a switching time period of downlink (DL)-uplink (UL) switching for half duplex-frequency division duplex (HD-FDD) operation according to an example implementation of the present disclosure. Although actions 1302, 1304, 1306, 1308 and 1310 are illustrated as separate actions represented as independent blocks in FIG. 13, these separately illustrated actions should not be construed as necessarily order dependent. The order in which the actions are performed in FIG. 13 is not intended to be construed as a limitation, and any number of the disclosed blocks may be combined in any order to implement the method, or an alternate method. Moreover, each of actions 1302, 1304, 1306, 1308 and 1310 may be performed independent of other actions and can be omitted in some implementations of the present disclosure.

In action 1302, the UE may receive a first configuration for a first active bandwidth part (BWP) with a first subcarrier spacing (SCS). The first active BWP is one of an active UL BWP and an active DL BWP.

In action 1304, the UE may receive a second configuration for a second active BWP with a second SCS. The second active BWP is another one of the active UL BWP and the active DL BWP. That is, the second active BWP is the active UL BWP if the first active BWP is the active DL BWP, and the second active BWP is the active DL BWP if the first active BWP is the active UL BWP.

In action 1306, the UE may receive a third configuration for the switching time period. The switching time period has a unit of symbol. That is, the unit for switching time period is per symbol.

If the first SCS is larger than the second SCS, the communication (e.g., a DL reception or an UL transmission) on the first active BWP ends at an ending symbol, and the switching time period begins at a starting symbol, the starting symbol of the switching time period may be determined based on the ending symbol of the communication on the first active BWP. That is, a starting symbol or a starting position of a switching time period may be determined based on the ending symbol of a communication (e.g., a DL reception or an UL transmission) in an active BWP with the largest SCS among the SCSs of all active DL and UL BWPs.

If the first SCS is larger than the second SCS, the communication (e.g., a DL reception or an UL transmission) on the second active BWP begins at a first starting symbol, the switching time period begins at a second starting symbol, and the second starting symbol of the switching time period may be determined based on the first starting symbol of the communication (e.g., a DL reception or an UL transmission) on the second active BWP. That is, a starting symbol or a starting position of a switching time period may be determined based on the starting symbol of a communication (e.g., a DL reception or an UL transmission) in an active BWP with the smallest SCS among the SCSs of all active DL and UL BWPs.

If the communication (e.g., a DL reception or an UL transmission) on the second BWP begins at a first starting symbol, and the switching time period begins at a second starting symbol, the second starting symbol of the switching time period may be determined based on the first starting symbol of the communication (e.g., a DL reception or an UL transmission). That is, a starting symbol or a starting position of a switching time period may be determined based on the starting symbol of a communication (e.g., a DL reception or an UL transmission) in a target BWP.

If the first active BWP is the active DL BWP, and the second active BWP is the active UL BWP, the switching time period may include a timing advance (TA) time period. A length of the switching time period may be determined based on the second SCS. That is, a length of the switching time period may be determined based on the SCS of the target BWP.

In action 1308, the UE may perform communication with a Base Station (BS) on the first active BWP with the first SCS. The communication may be a DL reception or an UL transmission.

In action 1310, the UE may perform, after the switching time period, communication with the BS on the second active BWP with the second SCS. The communication may be a DL reception or an UL transmission.

The method 1300 provided in the present disclosure enables a UE to specify a gap in time domain (e.g., the switching time period) between DL reception and UL transmission when multiple SCS configurations are configured. Moreover, the method 1300 provided in the present disclosure specifies the switching time period in unit of symbol to avoid the ambiguity of scheduling upon NR frame structure.

Figure 14:
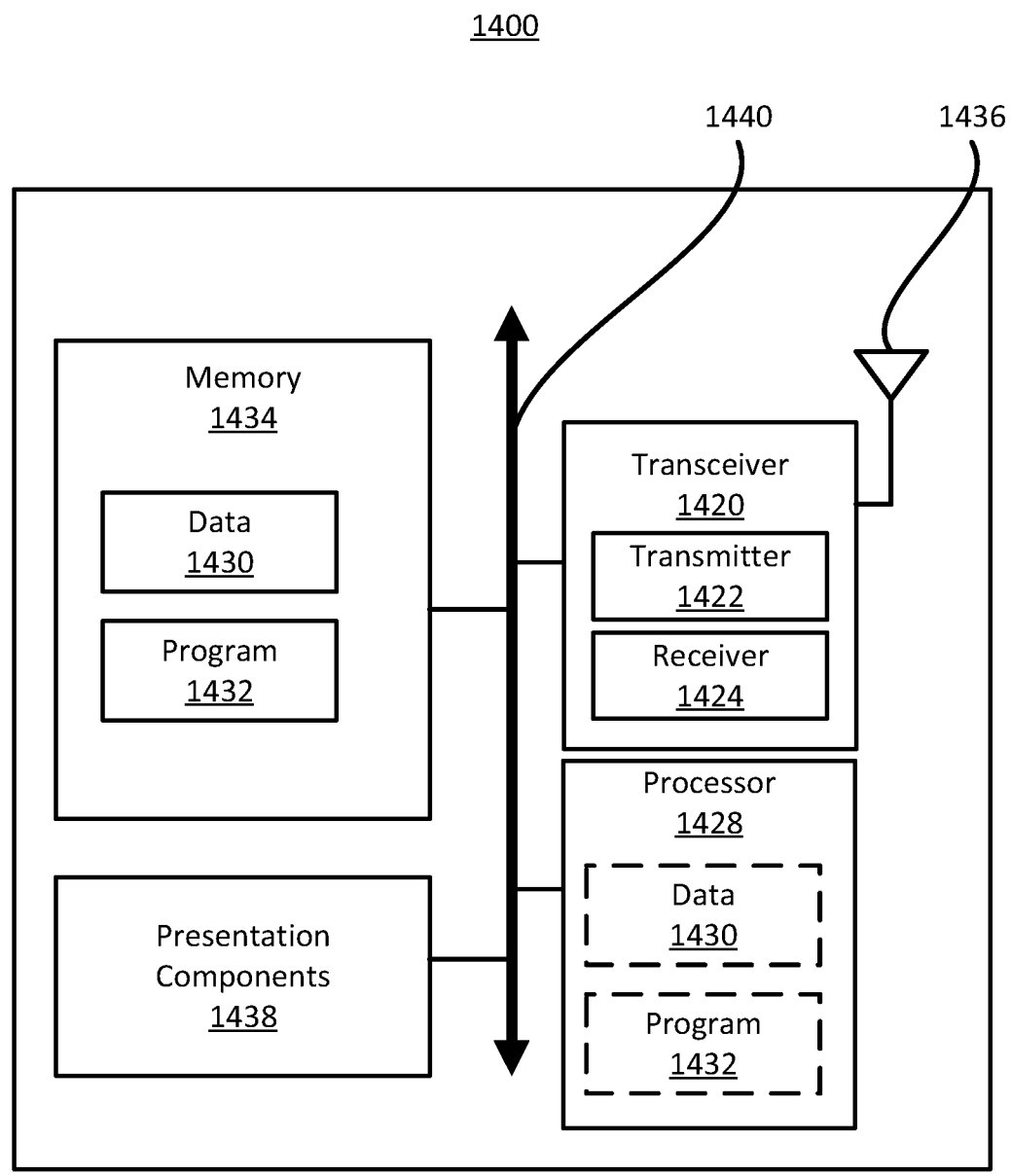
FIG. 14 is a block diagram illustrating a node for wireless according to an example implementation of the present disclosure.

FIG. 14 is a block diagram illustrating a node 1400 for wireless according to an example implementation of the present disclosure. As illustrated in FIG. 14, a node 1400 may include a transceiver 1420, a processor 1428, a memory 1434, one or more presentation components 1438, and at least one antenna 1436. The node 1400 may also include a radio frequency (RF) spectrum band module, a BS communications module, a network communications module, and a system communications management module, Input/Output (I/O) ports, I/O components, and a power supply (not illustrated in FIG. 14).

Each of the components may directly or indirectly communicate with each other over one or more buses 1440. The node 1400 may be a UE or a BS that performs various functions disclosed with reference to FIG. 13.

The transceiver 1420 has a transmitter 1422 (e.g., transmitting/transmission circuitry) and a receiver 1424 (e.g., receiving/reception circuitry) and may be configured to transmit and/or receive time and/or frequency resource partitioning information. The transceiver 1420 may be configured to transmit in different types of subframes and slots including but not limited to usable, non-usable and flexibly usable subframes and slot formats. The transceiver 1420 may be configured to receive data and control channels.

The node 1400 may include a variety of computer-readable media. Computer-readable media may be any available media that may be accessed by the node 1400 and include volatile (and/or non-volatile) media and removable (and/or non-removable) media.

The computer-readable media may include computer-storage media and communication media. Computer-storage media may include both volatile (and/or non-volatile media), and removable (and/or non-removable) media implemented in any method or technology for storage of information such as computer-readable instructions, data structures, program modules or data.

Computer-storage media may include RAM, ROM, EPROM, EEPROM, flash memory (or other memory technology), CD-ROM, Digital Versatile Disks (DVD) (or other optical disk storage), magnetic cassettes, magnetic tape, magnetic disk storage (or other magnetic storage devices), etc. Computer-storage media may not include a propagated data signal. Communication media may typically embody computer-readable instructions, data structures, program modules or other data in a modulated data signal such as a carrier wave or other transport mechanisms and include any information delivery media.

The term "modulated data signal" may mean a signal that has one or more of its characteristics set or changed in such a manner as to encode information in the signal. Communication media may include wired media such as a wired network or direct-wired connection, and wireless media such as acoustic, RF, infrared and other wireless media. Combinations of any of the previously listed components should also be included within the scope of computer-readable media.

The memory 1434 may include computer-storage media in the form of volatile and/or non-volatile memory. The memory 1434 may be removable, non-removable, or a combination thereof. Example memory may include solid-state memory, hard drives, optical-disc drives, etc. As illustrated in FIG. 14, the memory 1434 may store a computer-readable and/or computer-executable program 1432 (e.g., software codes) that are configured to, when executed, cause the processor 1428 to perform various functions disclosed herein, for example, with reference to FIG. 13. Alternatively, the program 1432 may not be directly executable by the processor 1428 but may be configured to cause the node 1400 (e.g., when compiled and executed) to perform various functions disclosed herein.

The processor 1428 (e.g., having processing circuitry) may include an intelligent hardware device, e.g., a Central Processing Unit (CPU), a microcontroller, an ASIC, etc. The processor 1428 may include memory. The processor 1428 may process the data 1430 and the program 1432 received from the memory 1434, and information transmitted and received via the transceiver 1420, the base band communications module, and/or the network communications module. The processor 1428 may also process information to send to the transceiver 1420 for transmission via the antenna 1436 to the network communications module for transmission to a CN.

One or more presentation components 1438 may present data indications to a person or another device. Examples of presentation components 1438 may include a display device, a speaker, a printing component, a vibrating component, etc.

In view of the present disclosure, it is obvious that various techniques may be used for implementing the disclosed concepts without departing from the scope of those concepts. Moreover, while the concepts have been disclosed with specific reference to certain implementations, a person of ordinary skill in the art may recognize that changes may be made in form and detail without departing from the scope of those concepts. As such, the disclosed implementations are to be considered in all respects as illustrative and not restrictive. It should also be understood that the present disclosure is not limited to the particular implementations disclosed and many rearrangements, modifications, and substitutions are possible without departing from the scope of the present disclosure.

What is claimed is:

1. A method performed by a user equipment (UE) for handling a switching time period of downlink (DL)-uplink (UL) switching for a half duplex-frequency division duplex (HD-FDD) operation, the method comprising:
   receiving a first configuration for a first active bandwidth part (BWP) with a first sub-carrier spacing (SCS), the first active BWP being one of an active UL BWP and an active DL BWP;
   receiving a second configuration for a second active BWP with a second SCS, the second active BWP being another one of the active UL BWP and the active DL BWP;
   receiving a third configuration for the switching time period, the switching time period having a unit of symbol or having an absolute value;
   performing communication with a Base Station (BS) on the first active BWP with the first SCS; and
   performing, after the switching time period, communication with the BS on the second active BWP with the second SCS, wherein:
   the communication on the second active BWP begins at a first starting symbol,
   the switching time period begins at a second starting symbol, and
   the second starting symbol is determined based on the first starting symbol.

2. The method according to claim 1, wherein the first SCS is larger than the second SCS.

3. The method according to claim 1, wherein:
   the first active BWP is the active DL BWP,
   the second active BWP is the active UL BWP, and
   the switching time period includes a timing advance (TA) time period.

4. The method according to claim 1, wherein a length of the switching time period is determined based on the second SCS.

5. A user equipment (UE) for handling a switching time period of downlink (DL)-uplink (UL) switching for a half duplex-frequency division duplex (HD-FDD) operation, the UE comprising:
   one or more non-transitory computer-readable media storing one or more computer-executable instructions; and
   at least one processor coupled to the one or more non-transitory computer-readable media, the at least one processor is configured to execute the one or more computer-executable instructions to:
   receive a first configuration for a first active bandwidth part (BWP) with a first sub-carrier spacing (SCS), the first active BWP being one of an active UL BWP and an active DL BWP;
   receive a second configuration for a second active BWP with a second SCS, the second active BWP being another one of the active UL BWP and the active DL BWP;
   receive a third configuration for the switching time period, the switching time period having a unit of symbol or having an absolute value;
   perform communication with a Base Station (BS) on the first active BWP with the first SCS; and
   perform, after the switching time period, communication with the BS on the second active BWP with the second SCS, wherein:
   the communication on the second active BWP begins at a first starting symbol,
   the switching time period begins at a second starting symbol, and
   the second starting symbol is determined based on the first starting symbol.

6. The UE according to claim 5, wherein the first SCS is larger than the second SCS.

7. The UE according to claim 5, wherein:
   the first active BWP is the active DL BWP,
   the second active BWP is the active UL BWP, and
   the switching time period includes a timing advance (TA) time period.

8. The UE according to claim 5, wherein a length of the switching time period is determined based on the second SCS.

\* \* \* \* \*